United States Patent [19]

Stein et al.

[11] Patent Number: 4,831,094

[45] Date of Patent: May 16, 1989

[54] ARTICLES HAVING SHAPE RECOVERING PROPERTIES AND A METHOD FOR USING IT

[75] Inventors: Claude Stein, Gouvieux, France; Hitoshi Nagai, Matsudo, Japan; Akio Ueda; Satoru Isomura, both of Yokohama, Japan

[73] Assignee: Societe Chimique des Charbonnages, S.A., Paris, France

[21] Appl. No.: 117,924

[22] Filed: Nov. 3, 1987

Related U.S. Application Data

[63] Continuation of Ser. No. 838,185, Mar. 6, 1986, abandoned, which is a continuation of Ser. No. 534,073, Sep. 20, 1983, abandoned.

[30] Foreign Application Priority Data

Sep. 20, 1982 [JP] Japan .............................. 57-163775
Feb. 2, 1983 [FR] France .............................. 83 01922

[51] Int. Cl.[4] .............................................. C08F 36/00
[52] U.S. Cl. ................................... 526/283; 526/280; 526/281; 526/282; 526/257
[58] Field of Search ............... 526/280, 281, 282, 283, 526/284

[56] References Cited

U.S. PATENT DOCUMENTS

| | | | |
|---|---|---|---|
| 3,453,247 | 1/1969 | Sartori et al. | 526/284 |
| 3,557,072 | 1/1971 | Vergne | 526/169 |
| 3,684,782 | 8/1972 | Longi et al. | 526/280 |
| 4,136,248 | 1/1979 | Tenney et al. | 526/281 |
| 4,178,424 | 12/1979 | Tenney et al. | 526/283 |
| 4,193,899 | 3/1980 | Brenner et al. | 524/216 |
| 4,203,884 | 5/1980 | Coran et al. | 524/518 |
| 4,250,063 | 2/1981 | Kotani et al. | 526/281 |
| 4,262,103 | 4/1981 | Minchak | 526/281 |

*Primary Examiner*—Joseph L. Schofer
*Assistant Examiner*—Peter D. Mulcahy
*Attorney, Agent, or Firm*—Finnegan, Henderson, Farabow, Garrett & Dunner

[57] ABSTRACT

Articles having shape recovering properties and methods of using them are disclosed. An article is formed from a composition containing a norbornene polymer by forming said polymer into an article having a first shape, then deforming the article in the solid state to a second shape and cooling the article to a first temperature at or below the glass transition temperature of the polymer to retain said second shape, and finally heating said article to a temperature above the first temperature to recover the first shape.

10 Claims, No Drawings

ARTICLES HAVING SHAPE RECOVERING PROPERTIES AND A METHOD FOR USING IT

This application is a continuation-in-part of application Ser. No. 838,185, filed Mar. 6, 1986 which was a continuation of application Ser. No. 534,073 filed Sept. 20, 1983, both now abandoned.

This invention relates to articles having shape recovering properties and to a method of using. More specifically, this invention relates to a method of using an article of polymer material, which comprises imparting deformation to the said polymer material in the solid state, then cooling the article to the glass transition temperature of the polymer or a lower temperature to set the deformation, and in use, heating the article to a temperature above the glass transition temperature of the polymer to recover the original shape.

Amorphous and semi-crystalline homopolymers and copolymers of norbornene and its alkylated, alkoxylated, mono- or diesterified, imides and carboxylic acid derivatives are already known, especially from French Pat. Nos. 1,543,797, 1,556,215, 1,594,934, 1,597,727, 1,598,320 and 1,599,185.

Such polymers were obtained essentially according to a catalytic process using transition metal salts such as ruthenium and iridium chlorides or else using Ziegler systems joining metals like molybdenum or tungstene to titanium chlorides or aluminumalkyls. These catalytic systems lead, almost exclusively, to a molecular chain by means of opening of the bicycloheptenic cycle according to the now well known metathesis mechanism.

It has been established that the glass transition temperature (Tg) of such polymers may be chosen at will by modifying either the nature and the length of the substituted chains R and R' carried by the cyclopentane cycle, or the respective ratios of comonomers, or else the catalytic system, or simultaneously the three parameters. So, the glass transition temperature of these polymers may easily vary between −90° C. and +90° C. Such polymers generally do not show rubbery properties at room temperature as such. The norbornene polymers, however, have the property of absorbing a large amount of oil, and by including a large amount of oil, it is possible to lower their glass transition temperatures, and impart rubbery properties to them. By utilizing these properties, they are used in the production of vulcanized rubber products as natural rubbers or ordinary synthetic rubbers.

On the other hand, the polymerization of dimethanooctahydronaphthalene (DMON) and of its substituted derivatives, as also the copolymerization of these monomers between them or with norbornene and its substituted derivatives, or else with olefinic momomers such as styrene or acenaphthalene is already known, especially from French Pat. No. 1,535,460. Such homo- and copolymers obtained essentially by means of opening of the cycle have, according to the respective ratios of co- or termonomer and to the nature of the substituents, glass transition temperatures from −60° C. to +200° C.

Works were also published concerning copolymers of norbornene or dimethanooctahydronaphthalene or their substituted derivatives with olefins like ethylene, propylene (U.S. Pat. No. 4,320,239), but-1-ene or hex-1-ene (U.S. Pat. No. 4,136,248).

Finally, numerous works have been assigned to mixtures of substituted or unsubstituted norbornene homo- or copolymers with thermoplastic materials such as chlorinated polyethylene and acrylonitrile-butadiene-styrene copolymers (U.S. Pat. No. 4,310,637), polymethylmethacrylate, polyvinylchloride, polystyrene (German Pat. No. 2,520,846), polyethylene and polypropylene (U.S. Pat. No. 4,203,884, European Pat. No. 18751).

The present invention relates, on the one hand, to articles made of a polymeric material having shape recovering properties i.e. able to recover their original shape after having been submitted first to a deformation in the solid state, then cooled till the glass transition temperature of the polymer, and lastly reheated above said temperature, consisting of a composition comprising at least 25% by weight of a polymer selected from amorphous and semi-crystalline homopolymers and copolymers of norbornene and its alkylated, cyano, alkoxylated, mono- or diesterified, imides and carboxylic acid derivatives, homopolymers and copolymers of dimethanooctahydronaphthalene and its derivatives, and copolymers of dimethanooctahydronaphthalene and of a monomer selected from norbornene and its derivatives, styrene, acenaphthalene and dicyclopentadiene, said polymer being possibly hydrogenated or halogenated.

The polymer forming part of the constitution of the articles having shape recovering properties according to the invention has a molecular weight between, for example, 300,000 and 4,000,000. Its glass transition temperature is between −90° C. and +200° C., preferably betweeen +10° C. and +120° C.

The memory phenomenon will be the more partial as the homopolymers or copolymers will have low molecular weights, thus low chain lengths, and/or as the substituents carried by the mono-, di- or tricyclic nuclei of the chains will be constituted by longer linear chains.

The memory phenomenon also will only be partial in co- or terpolymers of bicycloheptenes and/or dimethanocyclonaphthalenes with co- or termonomers of ethylene or propylene type and will be a function of the co- or termonomer ratio. On the contrary, the presence of polycyclo- or polydicyclopentadiene units in the chains will not at all be prejudicial to the memory effect.

The memory phenomenon will also be maintained at least partially by adding to the homo-, co-, or terpolymers with memory effect described hereabove, thermoplastic polymers such as polystyrene, polyvinylchloride, polyethylene, polypropylene, polybut-1-ene, polymethylmethacrylate, acrylonitrile-butadiene-styrene copolymers, hydrocarbon resins, in a proportion less than 75% by weight, relative to the composition.

It is permissible to add an oily component to the polymer in order to impart elasticity to it and control its hardness. The oily component used is at least one of a softening agent and a plasticizer. Plasticizers widely used for vinyl chloride resins and rubbers can be used. They include dibutyl phthalate, di-2-ethylhexyl phthalate, dioctyl sebacate, dioctyl adipate, tricresyl phosphate, epoxidized soybean oil, sesame oil, polypropylene adipata, etc.

The softening agent may, for example, be process oils widely used in rubbers, or their highly purified products. They include paraffinic process oils, naphthenic process oils and aromatic process oils.

It is also possible to use a crosslinking agent in order to adjust the properties of the articles of this invention. Crosslinking agents, such as sulfur and organic peroxides which are used normally in rubber and plastic fields can be used without any particular restriction. Vulcanization accelerators, activators, other crosslinking aids, can be used together with the crosslinking agents.

The amount of the oily component blended with the polymer is not more than 10% by weight.

The amount of the crosslinking agent to be added to the polymer is not more than 10% by weight. It may be within those amounts used normally in vulcanized rubber, and crosslinked plastic products. In compounding, it is permissable to add compounding chemicals such as stabilizers, fire retardants, coloring agents, organic or inorganic reinforcing agents and organic or inorganic fillers in amounts which do not deviate from the purport of this invention.

There is no particular restriction on the method of preparing the compound. For example, the polymer, an oily component, a crosslinking agent, and as required, a stabilizer, a fire retardant, a coloring agent, an organic or inorganic reinforcing agent, or an organic or inorganic filler, etc. are mixed by a mixer such as a roll, a Banbury mixer, a kneader or a Henschel mixer to form a moulding material. The moulding material is moulded into a moulded article of a predetermined shape by compression moulding, etc.

The present invention relates, on the other hand, to a method of using the articles described hereinabove, consisting of imparting deformation to the said article in the solid state, then cooling it to the glass transition temperature of the polymer to set the deformation, and heating the article to a temperature above the glass transition temperature of the polymer to recover the original shape. In the first step of the method according to the invention, deformation is imparted to the article preferably at a temperature lower than the handling temperature of the polymer. By handling temperature one means the moulding or calendering temperature in the case of moulded or injected articles, the blowing temperature in the case of films. This handling temperature is generally between 100° C. and 300° C. and depends, in a known manner, on the glass transition temperature and the molecular weight of the polymer.

The temperature and pressure at which the norbornene polymer is moulded into a predetermined shape are not restricted so long as these moulding conditions can give a moulded article of a predetermined shape and strength characteristics not detrimental to practical applications. The moulding temperature is usually 100° to 200° C., and the moulding pressure is usually 50 to 300 kg/cm$^2$.

The temperature at which deformation is imparted to the article of this invention in actual use may be any temperature below the handling temperature of the norbornene polymer. Deformation at a temperature equal to, or above, the handling temperature is undesirable because it will result in imparting a new shape. Preferably, the deformation temperature is from the glass transition temperature of the polymer to a temperature 30° C. higher than the glass transition temperature. It is possible to impart deformation at a temperature below the glass transition temperature.

The method of imparting deformation is not particularly restricted. Depending upon the shape, thickness, etc. of the article, the article is placed in an atmosphere kept at temperatures permitting easy deformation of the article (for example, in heated air, a heated liquid, steam, etc.), and deformed by hand or a suitable tool.

When the deformation temperature is above the glass transition temperature of the norbornene polymer, the deformed article should be cooled immediately after deformation to the glass transition temperature or a lower temperature in order to set the deformation. If the deformation temperature is the glass transition temperature or a lower temperature, the deformation is set at this temperature, and therefore, there is no necessity to cool it to a lower temperature.

To remove the deformation from the article and return it to an article of the predetermined shape, it is heated to a temperature above the deformation temperature but below the handling temperature. The deformation is automatically removed and the original shape is recovered. As the temperature is made higher, the time required for the article to recover its original shape becomes shorter. Generally it does not exceed 1 minute.

There is no particular restriction on the means of heating as in the case of imparting deformation. It is sufficient to heat the article to a temperature below the handling temperature by using heated air, steam, heated inert gas (such as nitrogen), etc.

When the method of this invention is carried out, the article which has once been deformed can be returned to its original given shape. Hence, where the shape of the article as such makes it difficult to mount, assemble, transport, etc. the article, it can be deformed to a shape easy for handling, and after the mounting, assembling, etc., its original shape can be recovered by heating.

Association of the memory phenomenon in the vicinity of Tg on the one hand, and the possibility to adapt the value of Tg in a very broad field of temperatures on the other hand, allows contemplation of numerous applications in the most varied uses when the thermoreversibility of the geometric shape is the requested aim. The followings may be cited for guidance and in a non-restrictive manner:

deformable games and toys
domestic articles and electric domestic appliances
thermosensitive instruments and security devices
arts and ornamentation units
medical and paramedical instruments and devices
office equipments
garden equipments
educative articles
tricks and jokes
building and hygiene accessories
automobile accessories
films and sheets for retractable housings.

Due to its glass transition temperature which is near 37° C., polybicyclohept-2-ene or polynorbornene offers a particular advantage for numerous applications in which the thermoreversibility before mechanical deformation may be obtained through simple immersion into a fluid (water or air for example) at moderate temperature, the concerned articles can then be in the form of plates, sheets, films, extruded strings, laminated moulded sections, yarns, fibres and in the shape of more complicated moulded or blown articles. The followings may be cited for guidance and in a non-restrictive manner:

coupling material for pipes of different diameters
building games accessories
suspension-mobile components
folding games
scale models accessories
uncreasable children books accessories for reduced-scale railways and automobiles (tunnels, inclined planes)
bath toys
flexible animals or dolls
target shootings
boots and shoes inserts
skiing accessories
suction-devices for vacuum-cleaners
pastry-making accessories
icicle cans
bulky camping articles
adaptable coat-hangers
retractable films and nets
sensitive window-blinds
isolation and blocking-up joints
fuses
alarm devices
sculpture accessories
lamps with articulations
adjustable lamp-shades
advertising shop-signs, display units
artificial flowers
vessels with adaptable shapes
adaptable hairdressing accessories
plates for braille that can be erased
thermosensitive writing slates
letters for magic alphabet
recoverable printing matrix
advertising holders
deformable rules, normographs
medical prosthesis
armchair backs for disabled people
orthopaedic jackets, corsets, minerves
geometric thermometers
automobile bumpers
etc.

The following examples are given by way of illustration of the invention.

EXAMPLE 1

A 2 mm-thick plate is prepared by moulding-compression at 140° C. for 10 minutes of a polybicyclohept-2-ene powder sold by CdF Chimie Company under the trademark NORSOREX N. This product has a glass transition temperature of +37° C., determined via differential enthalpic analysis. It has a molecular weight Mw of 2,000,000.
(a) Folding of this plate was carried out at 25° C., under an angle of 180°. The fold remains after release of the constraint. This folded plate was dipped in water at 42° C., the plate recovered its original shape.
(b) the same plate was subjected to rolling up around a 10 mm diameter mandrel. The plate remained rolled after release of the constraint. When dipped in water at 42° C., the plate instantaneously unfolded and recovered its original shape.
(c) the same plate initially moulded at 140° C. was folded at right angle in a metallic former heated at 170° C. during 10 minutes. After cooling, this plate was deformed at straight angle under a press at 25° C. The flat plate thus obtained recovered its right angle shape by dipping in water at 42° C.
(d) A 3 mm-thick and 100 mm-length test-piece was cut out of the moulded plate (a) hereabove and submitted to elongation at 25° C. in a dynamometer till a length of 130 mm was reached. This lenght was set after the constraint has been released. The test-piece recovered its 100 mm-length immediately when dipped in water at 45° C.

EXAMPLE 2

The same test as in Example 1 was run by moulding a 2 mm-thick plate under a press at 150° C., from polymethyl-cyclo-2,2,1-hept-2-ene-5-carboxylate having a molecular weight Mw of 350,000 and a glass transition temperature, determined via differential enthalpic analysis, of +65° C.
(a) after moulding and cooling to room temperature, this plate was dipped in a water-bath heated to 45° C. and was folded under a 180°-angle. The plate remained in this shape after the constraint has been released. Immediately after dipping in water heated to 70° C., it recovered its original flat shape.
(b) this plate was used as target and shoots were carried out from a 6-meters distance with a pneumatic rifle loaded with 5.5 mm-diameter lead bullets. The bullet impacts pointed out on the polymer plate had a depth of 0.5 to 0.6 mm.

The dipping of the thus deformed plate in water at 70° C. led immediately to the disappearance of the impact prints.

EXAMPLE 3

A powder of a norbornene polymer (NORSOREX, a product of CdF Company, France; glass transition temperature 35°.C.; molecular weight more than 2,000,000) was charged into a mould, and left to stand for 10 minutes at a moulding temperature of 150° C. and a moulding pressure of 130 kg/cm$^2$ to obtain a cylindrical moulded article having a diameter of 5 mm and a length of 20 mm. In warm water at 45° C., this moulded article was held at its both ends by a pair of pincers and extended to a diameter of about 3 mm. When in the extended state, the temperature was returned to room temperature, the shape in the extended state was set. When the moulded article was again dipped in warm water at 45° C., its original shape was completely returned. The time required for recovering the original shape was about 10 seconds.

EXAMPLE 4

An O-ring having an inside diameter of 30 mm and an outside diameter of 2 mm was moulded in the same way as in Example 3. The moulded product was twisted through 5 turns in a figure 8-shape in hot air at 50° C. and in the twisted state, dipped in water at 25° C. The twisted shape was then set. When this moulded article was again left to stand in hot air at 45° C., its original shape was completely recovered. The time required for the recovery of the original shape was about 15 seconds.

The O-ring was cut off at one point, and elongated to about 3 times at room temperature. One rod-like shape, 3 times as long as the original shape, was set. When this material was dipped in warm water at 60° C., it immediately returned to the original O-ring shape. The time required for the recovery of the original shape was about 5 seconds.

EXAMPLE 5

The same norbornene polymer powder as in Example 3 was charged into a mould, and left to stand for 15 minutes at a moulding temperature of 160° C. and a moulding pressure of 100 kg/cm$^2$ to obtain a sheet-like moulded article having a thickness of 0.3 mm, a width of 30 mm and a length of 150 mm. Thereafter, the moulded article was wound up on an iron core having a diameter of 5 mm in hot air at 40° C. When the temperature was returned to room temperature, the rolled article was obtained. When this article was left to stand again in hot air at 40° C., its original shape was completely recovered, and the sheet-like article resulted. The time required for recovery was about 15 seconds.

EXAMPLE 6

Two parts of an oily component (naphthenic process oil; Sunthene-255 produced by Nippon Sun Oil Co., Ltd) was added to 100 parts by weight of the same norbornene polymer powder as used in Example 3 in a Henschel mixer. The mixture was charged into a mould and left to stand for 15 minutes at a moulding temperature of 150° C. and a moulding pressure of 150 kg/cm$^2$ to obtain a cylindrical moulded article having a diameter of 25 mm and a height of 12 mm. The moulded article was compressed in warm water at 50° C. by a pair of pincers, etc. to impart large deformation, and immediately dipped in water at 25° C. to set the shape. When this article was dipped in warm water at 50° C., its original shape was completely recovered. The time required for the recovery of the original shape was about 20 seconds.

EXAMPLE 7

One hundred parts by weight of the same norbornene polymer powder as used in Example 3 was mixed with 2 parts by weight of the oil component of Example 6, 5 parts by weight of zinc oxide, 1 part by weight of stearic acid, 1.5 parts by weight of sulfur and 5 parts by weight of cyclohexylbenzothiazyl sulfenamide as a vulcanization accelerator in a Henschel mixer. The mixture was charged into a mould and left to stand for 15 minutes at a moulding temperature of 150° C. and a moulding pressure of 150 kg/cm$^2$ to obtain a sheet-like moulded article having a thickness of 2 mm, a width of 30 mm and a length of 150 mm. Then, the moulded article was helically twisted in warm water at 50° C. When in this state, the moulded article was dipped in water at 25° C., the twisted shape was set. When the twisted article was dipped again in warm water at 50° C., its original shape was completely recovered and the sheet-like article resulted. The time required for the recovery was about 15 seconds.

EXAMPLE 8

A mixture of 60 parts by weight of the polymer powder of Example 1 and 40 parts by weight of a hydrocarbon resin marketed by CdF CHIMIE under the trademark NORSOLENE SP 70 was moulded, in the same way as in Example 1, to obtain a 2 mm-thick plate. (NORSOLENE SP 70 is prepared from aromatic hydrocarbons selected from styrene, methyl-styrenes, vinyltoluenes, indene, and methyl-indenes.) Folding of this plate was carried out at 25° C. under an angle of 180°: folding remains after release of the constraint. The folded plate was dipped in warm water at 42° C.; and its original shape was completely recovered.

What we claim is:

1. A method of using a shaped article having shape recovering properties and formed from a composition comprising at least 25% by weight of a polymer selected from the group consisting of amorphous and semi-crystalline homopolymers and copolymers of norbornene and its alkylated, cyano, alkoxylated, mono- or diesterified, imides and carboxylic acid derivatives; homopolymers and copolymers of dimethanooctahydronaphthalene and its derivatives; a copolymer of dimethanooctahydronaphthalene and a monomer selected from the group consisting of norbornene and its derivatives, styrene, acenaphthalene and dicyclopentadiene, said method comprising forming said composition into an article having a first shape, deforming said article in the solid state to a second shape, cooling said article to a first temperature at or below the glass transition temperature of said composition, at which first temperature said composition stably maintains said second shape, and heating said article to a temperature above said first temperature thereby recovering said first shape.

2. The method according to claim 1 wherein said polymer has a molecular weight of between 300,000 and 4,000,000.

3. The method according to claim 1 wherein said polymer has a glass transition temperature of between −90° C. and +200° C.

4. The method according to claim 3 wherein said polymer has a glass transition temperature of between +10° C. and 30 120° C.

5. The method according to claim 1 wherein said polymer is halogenated or hydrogenated.

6. The method according to claim 1 wherein said composition further comprises up to 10% by weight of an oily component.

7. The method according to claim 1 wherein the article is deformed at a temperature lower than the handling temperature of the polymer.

8. The method according to claim 1 wherein said composition comprises less than 75% by weight of a thermoplastic polymer.

9. The method according to claim 1 wherein said composition further comprises up to 10% by weight of a crosslinking agent.

10. The method according to claim 9 wherein said thermoplastic polymer is selected from polystyrene, polyvinylchloride, polyethylene, polypropylene, polybut-1-ene, polymethylmethacrylate, acrylonitrile-butadiene-stryene copolymers and hydrocarbon resins.

* * * * *

UNITED STATES PATENT AND TRADEMARK OFFICE
CERTIFICATE OF CORRECTION

PATENT NO. : 4,831,094
DATED : May 16, 1989
INVENTOR(S) : Claude Stein et al.

It is certified that error appears in the above-identified patent and that said Letters Patent is hereby corrected as shown below:

Claim 4, column 8, line 35 (line 3 of claim) change "30 120°C." to --+120°C.--

Signed and Sealed this

Twenty-eighth Day of November 1989

Attest:

JEFFREY M. SAMUELS

Attesting Officer        Acting Commissioner of Patents and Trademarks